(12) United States Patent
Eom

(10) Patent No.: US 7,245,573 B2
(45) Date of Patent: Jul. 17, 2007

(54) APPARATUS AND METHOD FOR DETECTING SECTOR SYNC SIGNAL ON AN OPTICAL STORAGE MEDIUM

(75) Inventor: Woo-sik Eom, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 726 days.

(21) Appl. No.: 10/414,159

(22) Filed: Apr. 16, 2003

(65) Prior Publication Data

US 2003/0198164 A1    Oct. 23, 2003

(30) Foreign Application Priority Data

Apr. 17, 2002 (KR) ................. 2002-20911

(51) Int. Cl.
*G11B 7/00* (2006.01)
(52) U.S. Cl. ................................. 369/53.34
(58) Field of Classification Search ............ 369/47.28, 369/59.26, 53.34, 124.08
See application file for complete search history.

(56) References Cited

U.S. PATENT DOCUMENTS

| | | | | |
|---|---|---|---|---|
| 5,677,935 A | * | 10/1997 | Karino | .............. 375/368 |
| 6,069,855 A | * | 5/2000 | Fuma et al. | .............. 369/47.19 |
| 2001/0024412 A1 | * | 9/2001 | Fujiwara | .............. 369/53.34 |
| 2002/0009030 A1 | * | 1/2002 | Matsumoto et al. | .............. 369/47.53 |
| 2002/0021636 A1 | * | 2/2002 | Moriwaki | .............. 369/47.22 |
| 2002/0172103 A1 | * | 11/2002 | Yamawaki | .............. 369/30.11 |

* cited by examiner

*Primary Examiner*—Wayne Young
*Assistant Examiner*—Lixi Chow
(74) *Attorney, Agent, or Firm*—Staas & Halsey LLP

(57) ABSTRACT

An apparatus and method to detect an LPP sync signal on an optical storage medium include a frame sync bit detection unit detecting frame sync bits from the LPP sync signal on the optical storage medium and a sync detection unit determining whether continuity exists in the detection of the frame sync bits and detecting a 6-bit sector sync or a 3-bit sector sync using a 6-bit long window or a 3-bit long window, respectively, in response to a result of the determination. The apparatus further includes a sync detection result output unit outputting a sector sync detection period when continuity exists in the detection of frame sync bits and in the detection of the 3-bit sector sync or 6-bit sector sync and counting a sync detection signal and a new sync detection period when a sector sync signal is detected by the sync detection unit.

39 Claims, 7 Drawing Sheets

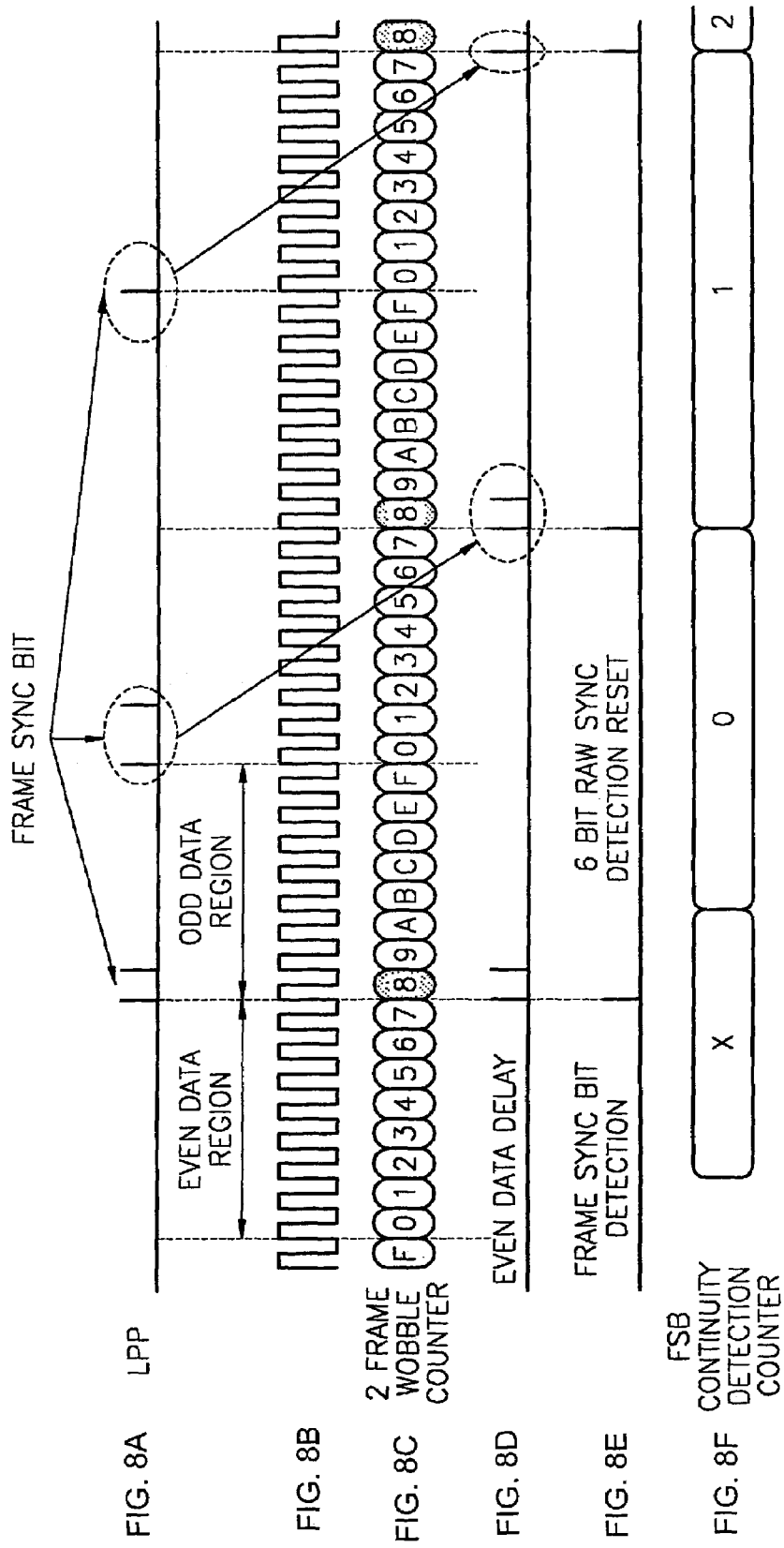

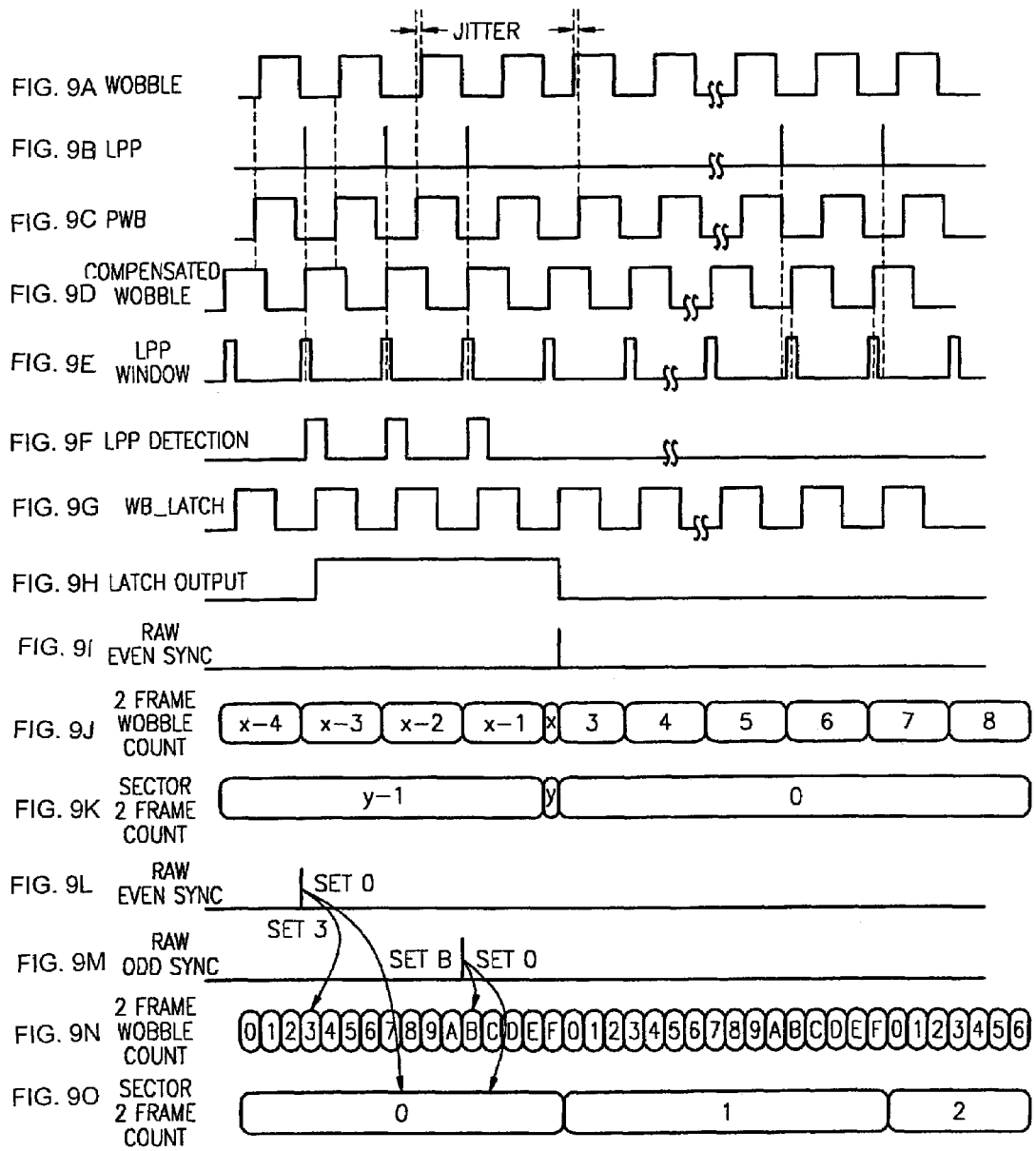

APPARATUS AND METHOD FOR DETECTING SECTOR SYNC SIGNAL ON AN OPTICAL STORAGE MEDIUM

CROSS-REFERENCE TO RELATED APPLICATIONS

This application claims the benefit of Korean Application No. 2002-20911, filed Apr. 17, 2002, in the Korean Intellectual Property Office, the disclosure of which is incorporated herein by reference.

BACKGROUND OF THE INVENTION

1. Field of the Invention

The present invention relates to a method of controlling an optical storage medium, and more particularly, to an apparatus and a method of detecting sector sync signals on an optical storage medium.

2. Description of the Related Art

Optical storage media, such as a DVD-R or a DVD-RW, include land pre-pits (LPPs) which are formed by carving pits, where address information is contained on a land during a manufacture of a disk substrate. An LPP signal is read from an optical storage medium using a light beam, which is irradiated on the optical storage medium to follow tracks thereon, and is measured using an optical pickup of a data recorder before and after recording data on the optical storage medium.

A sequence of LPP data corresponds to 16 sectors physically having the same size as an error correction code (ECC) block to be recorded in a groove. Three bits b2, b1, and b0 are allotted to each sync frame of the LPP signal. A first bit (i.e., a first frame sync bit) among the three bits is placed at a specific region of a sync written in $8/16$ modulated data in a groove. The three-bit arrangements are shown in Table 1 as follows.

|  | b2 | b1 | b0 |
|---|---|---|---|
| Sector syncs at even positions | 1 | 1 | 1 |
| Sector syncs at odd positions | 1 | 1 | 0 |
| Data = 1b | 1 | 0 | 1 |
| Data = 0b | 1 | 0 | 0 |

The optical storage medium includes 16 sectors, and a sector sync signal indicating that a sector begins is recorded in each sector in the form of the three bits b2, b1, and b0 of the LPP signal. One sector can be divided into 26 frames, and the sector sync signal is recorded at an even position where a first frame begins or at an odd position where a second frame begins. The sector sync signal recorded at the even position has a binary value of "111", and the sector sync signal recorded at the odd position has a binary value of "110". Among the LPP signals, the LPP signals recorded on the optical storage medium having a binary value of "101" are interpreted as modulated signals of "1", and the LPP signals recorded on the optical storage medium having a binary value of "100" are interpreted as modulated signals of "0".

FIG. 1 is a diagram showing a relationship between the locations of the LPP signals and the sector on the optical storage medium. A one-bit LPP signal can be detected at the beginning of each frame. When one sector includes the 26 frames, each of the 26 frames is given a different number between 0 and 25. The sector sync signals, which include even syncs and odd syncs, can be respectively detected at the beginning of frames 0, 2, and 4 and at the beginning of frames 1, 3, and 5 begin. The LPP signal detected at the beginning of each frame has a one-bit size. The LPP signal is generally recorded at the beginning of an even frame rather than at the beginning of an odd frame. In a mastering process, the LPP signal located on a predetermined land is forced to move to an odd position on the same land if there already exists another LPP signal on a neighboring land, as shown in FIG. 2.

In order to record the data in the grooves on the optical storage medium or to reproduce the data recorded on the optical storage medium, precise position control is necessary on the optical storage medium. Accordingly, various strategies for detecting the sector sync signals, which can bring about less detection errors, are necessary to precisely perform such position control.

SUMMARY OF THE INVENTION

Additional aspects and/or advantages of the invention will be set forth in part in the description which follows and, in part, will be obvious from the description, or may be learned by practice of the invention.

According to an aspect of the present invention there is provided an apparatus and a method to detect sector sync signals on an optical storage medium allowing data to be recorded well on or reproduced well from the optical storage medium.

According to an aspect of the present invention, there is provided an apparatus for detecting an LPP sync signal on an optical storage medium. The apparatus includes a frame sync bit detection unit detecting frame sync bits from the LPP sync signal on the optical storage medium; a sync detection unit determining whether continuity exists in the detection of the frame sync bits and detecting a 6-bit sector sync or a 3-bit sector sync using a 6-bit long window or a 3-bit long window, respectively, in response to a result of the determination; and a sync detection result output unit outputting a sector sync detection period when continuity exists in the detection of frame sync bits and in the detection of the 3-bit sector sync or the 6-bit sector sync and counting a sync detection signal and a new sync detection period when a sector sync signal is detected by the sync detection unit.

In accordance with an aspect of the present invention, in a DVD-R or a DVD-RW, the 6-bit sector sync detected at an even position has a pattern of 'x01110' or '001111'.

In accordance with an aspect of the present invention, in a DVD-R or a DVD-RW, the 6-bit sector sync detected at an odd position has a pattern of '001100'.

In accordance with an aspect of the present invention, in a DVD-R or a DVD-RW, the 3-bit sector sync detected at an even position has a pattern of '111'.

In accordance with an aspect of the present invention, in a DVD-R or a DVD-RW, the 3-bit sector sync detected at an odd position has a pattern of '100'.

In accordance with an aspect of the present invention, the 3-bit sector sync is detected when the frame sync bits are consecutively detected by the frame sync bit detection unit over a predetermined period of time, and the 6-bit sector sync is detected when the frame sync bits are not consecutively detected.

In accordance with an aspect of the present invention, the sync detection result output unit includes a two frame wobble counter counting cycles of a wobble signal over two frames, and a sector two frame counter counting every two frames of one sector.

In accordance with an aspect of the present invention, the two frame wobble counter circularly counts from 0 to 15 during a predetermined period of time that the frame sync bits are consecutively detected and starts counting with a predetermined count value as an initial value when the sector sync signal is detected by the sync detection unit when the frame sync bits are not consecutively detected.

In accordance with an aspect of the present invention, a count value of the two frame wobble counter is set to "3" when a 6-bit even sync is detected and the frame sync bits are not consecutively detected.

In accordance with an aspect of the present invention, a count value of the two frame wobble counter is set to "11" when a 6-bit odd sync is detected and the frame sync bits are not consecutively detected.

In accordance with an aspect of the present invention, a count value of the two frame wobble counter is set to "2" when a 3-bit even sync is detected and the frame sync bits are not consecutively detected.

In accordance with an aspect of the present invention, a count value of the two frame wobble counter is set to "10" when a 3-bit odd sync is detected and the frame sync bits are not consecutively detected.

In accordance with an aspect of the present invention, the sector two frame counter circularly counts from 0 to 12 during a predetermined period of time that the frame sync bits as well as the 3-bit sector sync or the 6-bit sector sync is consecutively detected, and starts counting with a predetermined count value as an initial value when the frame sync bits, the 3-bit sector sync, or the 6-bit sync bit are not consecutively detected.

In accordance with an aspect of the present invention, a count value of the sector two frame counter is reset to "0" when an even sync or an odd sync is detected and the frame sync bits or the sector sync signal is not consecutively detected.

In accordance with an aspect of the present invention, the frame sync bit detection unit includes an LPP even position delay unit detecting the LPP sync signal on the optical recording medium, moving data at an even position to an odd position, and detecting the frame sync bits from results of performing a logic OR operation on the data moved to the odd position and the data originally placed at the odd position.

In accordance with an aspect of the present invention, the apparatus for detecting an LPP signal on an optical storage medium further includes a sync continuity detection unit determining whether continuity exists in the detection of the 3-bit sector sync or the 6-bit sector sync, generating a sync detection window at a sync generation count location based on outputs of the two frame wobble counter and the sector two frame counter, and determining that continuity exists in the detection of the 3-bit sector sync or the 6-bit sector sync when the 3-bit sector sync is detected in the corresponding window.

According to another aspect of the present invention, there is provided a method of detecting an LPP signal on an optical storage medium. The method includes detecting frame sync bits from the LPP signal on the optical storage medium; determining whether continuity exists in the detection of the frame sync bits; detecting a 3-bit sector sync using a 3-bit long window when continuity exists in the detection of the frame sync bits; detecting a 6-bit sector sync using a 6-bit long window when continuity does not exist in the detection of the frame sync bits; outputting a sync detection period when continuity exists in the detection of the frame sync bits and in the detection of the 3-bit sector sync or the 6-bit sector sync; and outputting a predetermined sync detection count value when a sector sync signal detected when there is no continuity in the detection of the frame sync bits and in the detection of the 3-bit sector sync or the 6-bit sector sync.

In accordance with an aspect of the present invention, in a DVD-R or a DVD-RW, the 6-bit sector sync detected at an even position has a pattern of 'x01110' or '001111'.

In accordance with an aspect of the present invention, in a DVD-R or a DVD-RW, the 6-bit sector sync detected at an odd position has a pattern of '001100'.

In accordance with an aspect of the present invention, in a DVD-R or a DVD-RW, the 3-bit sector sync detected at an even position has a pattern of '111'.

In accordance with an aspect of the present invention, in a DVD-R or a DVD-RW, the 3-bit sector sync detected at an odd position has a pattern of '100'.

In accordance with an aspect of the present invention, when outputting a result of the detection of the 3-bit sector sync or the 6-bit sector sync, a count value indicating a number of cycles of a wobble signal in two frames and a count value indicating a number pairs of frames existing in one sector are output.

In accordance with an aspect of the present invention, the count value obtained by counting cycles of the wobble signal in two frames circularly changes between 0 and 15 when the frame sync bits are consecutively detected and counting starts with a predetermined count value as an initial value when the sector sync is detected and the frame sync bits are not consecutively detected.

In accordance with an aspect of the present invention, the count value obtained by counting cycles of the wobble signal in two frames is set to "3" when a 6-bit even sync is detected and the frame sync bits are not consecutively detected.

In accordance with an aspect of the present invention, the count value obtained by counting cycles of the wobble signal in two frames is set to "11" when a 6-bit odd sync is detected and the frame sync bits are not consecutively detected.

In accordance with an aspect of the present invention, the value obtained by counting cycles of the wobble signal in two frames is set to "2" when a 3-bit even sync is detected and the frame sync bits are not consecutively detected.

In accordance with an aspect of the present invention, the count value obtained by counting cycles of the wobble signal in two frames is set to "10" when a 3-bit odd sync is detected and the frame sync bits are not consecutively detected.

In accordance with an aspect of the present invention, the count value indicating the number of pairs of frames existing in one sector circularly changes between 0 and 12 during the frame sync bits and the 3-bit sector sync or the 6-bit sector sync is consecutively detected, and counting starts with a predetermined count value as an initial value when the frame sync bits or the sync bits are not consecutively detected.

In accordance with an aspect of the present invention, the count value indicating how many pairs of frames exist in one sector is reset to "0" when an even sync or an odd sync is detected when the frame sync bits or the sync bits are not consecutively detected.

In accordance with an aspect of the present invention, detecting the frame sync bits is performed after the LPP signal is detected on the optical recording medium, data at an even position is moved to an odd position, and frame sync bits are detected from results of performing a logic OR operation on the data moved to the odd position and the data originally placed at the odd position and delaying the result of the logic OR operation.

In accordance with an aspect of the present invention, the method of detecting an LPP signal on an optical storage medium further includes determining whether continuity exists in the detection of the sector sync signals. Here, in determining whether continuity exists in the detection of the sector sync signals, a sync detection window is generated at a sync generation count position, and continuity is determined in the detection of the sector syncs when the 3-bit sector sync is detected in a corresponding window.

In accordance with an aspect of the present invention, there is provided an LPP signal detection circuit to detect an LPP sync signal on an optical storage medium, including: a wobble PLL unit outputting a wobble clock signal from a phase locked loop in response to an input wobble signal and a PLL wobble signal synchronized with the wobble clock signal; a wobble phase difference detection unit detecting a phase difference between a predetermined phase reference signal and the PLL wobble signal output from the wobble PLL unit; a wobble phase difference compensation unit compensating a phase of the PLL wobble signal by the phase difference detected by the wobble phase difference detection unit; a sector sync detection unit detecting sector sync signals from the LPP sync signal using the PLL wobble signal having the compensated phase, wherein the sector sync signals are selectively detected using a 6-bit detection window or a 3-bit detection window depending on whether a sync bit recorded in each frame making a sector is consecutively detected and is reflected; a LPP data conversion unit receiving a count value indicating the detection of the sector sync signals from the sector sync detection unit and converting three-bit long LPP signals into data values of "1" or "0"; and an LPP decoding unit arranging the data values received from the LPP data conversion unit and performing an error correction code ECC correction on the data.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 8A to 8F are diagrams illustrating an operation of a unit to delay the LPP signal at an even position, shown in FIG. 5; and FIGS. 9A to 9O are timing diagrams of signals output from elements shown in FIGS. 4 and 5.

DETAILED DESCRIPTION OF THE INVENTION

Figure 1:
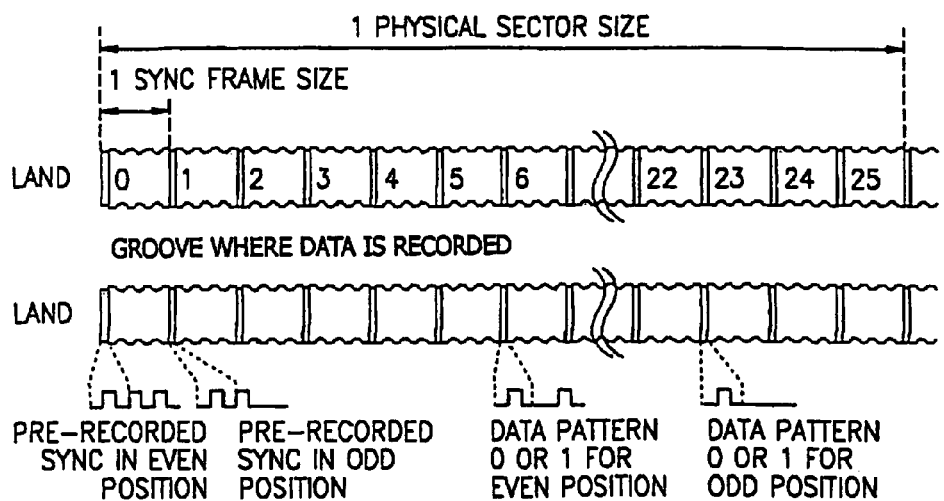
FIG. 1 is a diagram showing a relationship between positions of LPP signals and a sector on an optical storage medium.
Figure 2:
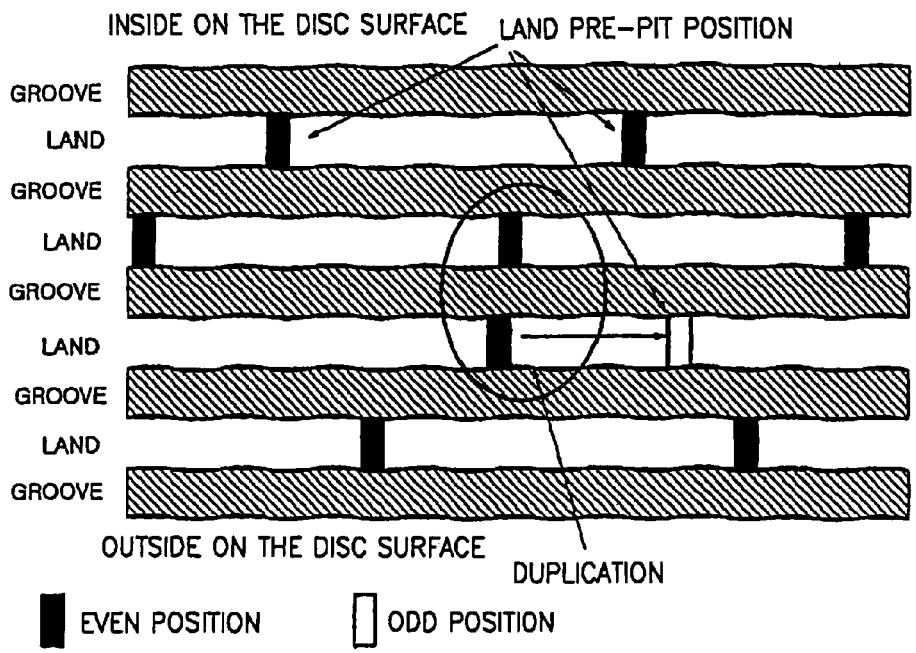
FIG. 2 is a diagram showing an example of moving an LPP signal on a predetermined land to an odd position when another LPP signal on a neighboring land exists.
Figure 3:
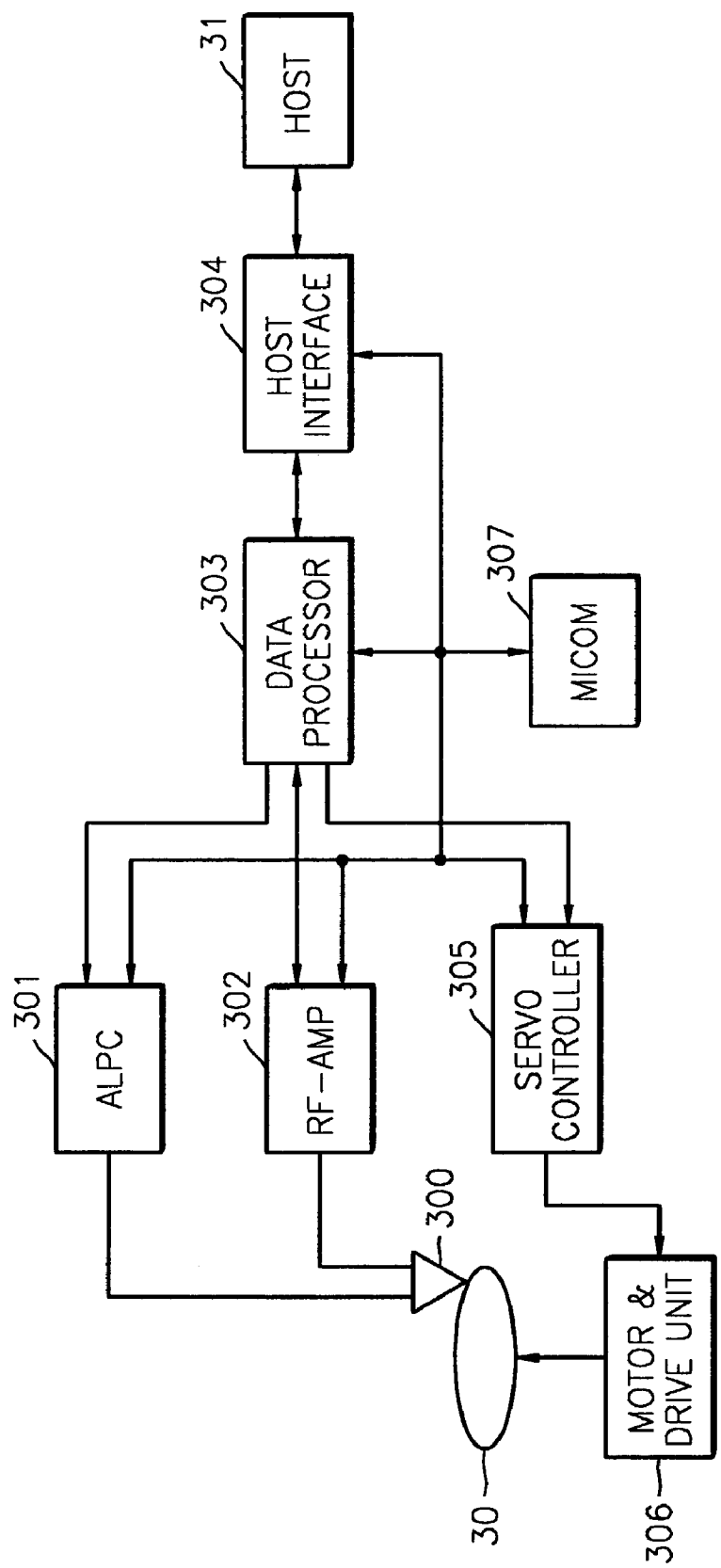
FIG. 3 is a block diagram of a typical apparatus to record/reproduce data on/from the optical storage medium.

Hereinafter, aspects of the present invention will be described in detail with reference to the attached drawings. The present invention may, however, be embodied in many different forms and should not be construed as being limited to the aspects set forth herein; rather, these aspects are provided so that the present disclosure will be thorough and complete, and will fully convey the concept of the invention to those skilled in the art. FIG. 3 is a block diagram of a typical apparatus to record/reproduce data on/from an optical storage medium. Referring to FIG. 3, the apparatus to record/reproduce the data on/from the optical storage medium includes a pickup unit 300, an adaptive laser power controller (ALPC) 301, a radiofrequency amplifier (RF-AMP) 302, a data processor 303, a host interface unit 304, a servo control unit 305, and a motor and drive unit 306.

The pickup unit 300 reads a signal recorded on an optical storage medium 30. The ALPC 301 receives a write pulse signal and a write clock signal from the data processor 303 and controls an amount of laser in order to record the data on the optical storage medium 30. Accordingly, the write pulse signal can be recorded on the optical storage medium 30 in a form of a record mark by the pickup unit 300 in response to the write clock signal.

The RF-AMP 302 amplifies a minute electric signal output from the pickup unit 300, detects a reproduction signal and a wobble signal from the amplified electric signal, and provides the reproduction signal and the wobble signal to the data processor 303.

To reproduce the data from the optical storage medium 30, the data processor 303 performs sync-detection, insertion, protection, demodulation, and error detection and correction by using the reproduction signal and the wobble signal output from the RF-AMP 302. The data processor 303 generates various control signals for the RF-AMP 302 and provides a servo-related signal to the servo controller 305. To record the data on the optical storage medium 30, the data processor 303 performs data modulation and error-correction-encoding on the data received from the host 31 via the host interface unit 304, thus, generating the write pulse signal to provide the write pulse signal to the ALPC 301. The data processor 303, in accordance with an aspect of the present invention, includes a circuit to effectively detect a sync (an LPP sector sync in a DVD-R or a DVD-RW), which will be described later with reference to FIG. 4.

The host interface unit 304 interfaces with the data processor 303 of the apparatus to record/reproduce the data on/from the optical storage medium with the host 31.

The servo controller 305 receives a servo-related signal from the data processor 303 and performs servo control operations, such as motor control to control a rotation speed of the optical storage medium 30, tracking, and focusing.

The motor and drive unit 306 includes a motor for rotating the optical storage medium 30 and a drive for driving the motor. The motor and drive unit 306 controls the motor and the drive in response to a motor driving signal and a servo driving signal input from the servo controller 305 in order to perform servo tracking or servo focusing.

The apparatus to record/reproduce the data on/from the optical storage medium may further include a micom 307 to generally control the above-mentioned blocks and a flow of signals therebetween.

Figure 4:
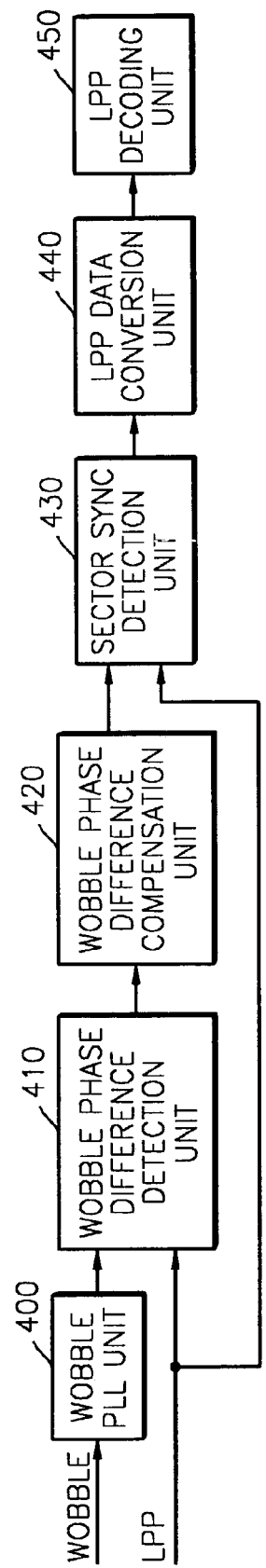
FIG. 4 is a schematic view of an LPP signal detection circuit, according to an aspect of the present invention.

FIG. 4 is a schematic view of an LPP signal detection circuit. Referring to FIG. 4, the LPP signal detection circuit includes a wobble phase locked loop (PLL) unit 400, a wobble phase difference detection unit 410, a wobble phase difference compensation unit 420, a sector sync detection unit 430, an LPP data conversion unit 440, and an LPP decoding unit 450.

The wobble PLL unit 400 outputs a wobble clock signal wbclk, which is output from a phase locked loop in response to an input wobble signal, and a PLL wobble signal synchronized with the wobble signal. The wobble signal output from the radiofrequency amplifier 302 of FIG. 3 may include various channel distortion components, such as a jitter component. The PLL wobble signal having such channel distortion components removed but having the same frequency as that of the wobble signal can be obtained using the phase locked loop having the wobble signal as an input signal. The wobble clock signal wbclk has the same frequency as the frequency of a channel clock. The frequency of the wobble clock signal wbclk in the optical storage medium, such as a DVD-R/RW is 186 times as high as that of the wobble signal.

The wobble phase difference detection unit 410 detects a difference in phases between a predetermined phase reference signal, for example, the LPP signal in the DVD-R/RW, and the PLL wobble signal output from the wobble PLL unit 400. The wobble phase difference compensation unit 420 compensates a phase of the PLL wobble signal by as much as the phase difference detected by the wobble phase difference detection unit 410 and outputs a result of the compensation.

The sector sync detection unit 430 detects a sector sync signal from the LPP signal using the PLL wobble signal having the compensated phase. In an accordance with an aspect of the present invention, the sector sync signal is selectively detected using a 6-bit detection window or a 3-bit detection window. The selection of the 6-bit detection window or the 3-bit detection window depends on whether or not a sync bit recorded in each frame making a sector is consecutively detected and is reflected. If frame sync bits are consecutively detected a predetermined number of times and it is also guaranteed that sector sync signals have been consecutively detected, the sector sync detection unit 430 circularly outputs a wobble count value obtained during 2-frame-length and every 2-frame-count value in a sector to indicate when to detect the sector sync signal at a certain count value. If it is not guaranteed that the frame sync bits and the sector sync signals will be consecutively detected, the sector sync detection unit 430 forcibly outputs a certain count value right after the sector sync signal is detected.

The LPP data conversion unit 440 receives the count value indicating the detection of the sector sync signal from the sector sync detection unit 430 and converts three-bit long LPP signals into data values of "1" or "0".

The LPP decoding unit 450 arranges the data received from the LPP data conversion unit 440 and performs an error correction code ECC correction on the data. Thereafter, the LPP decoding unit 450 obtains address information and various control information from the ECC-corrected data and provides the address information and the control information to the micom 307.

Figure 5:
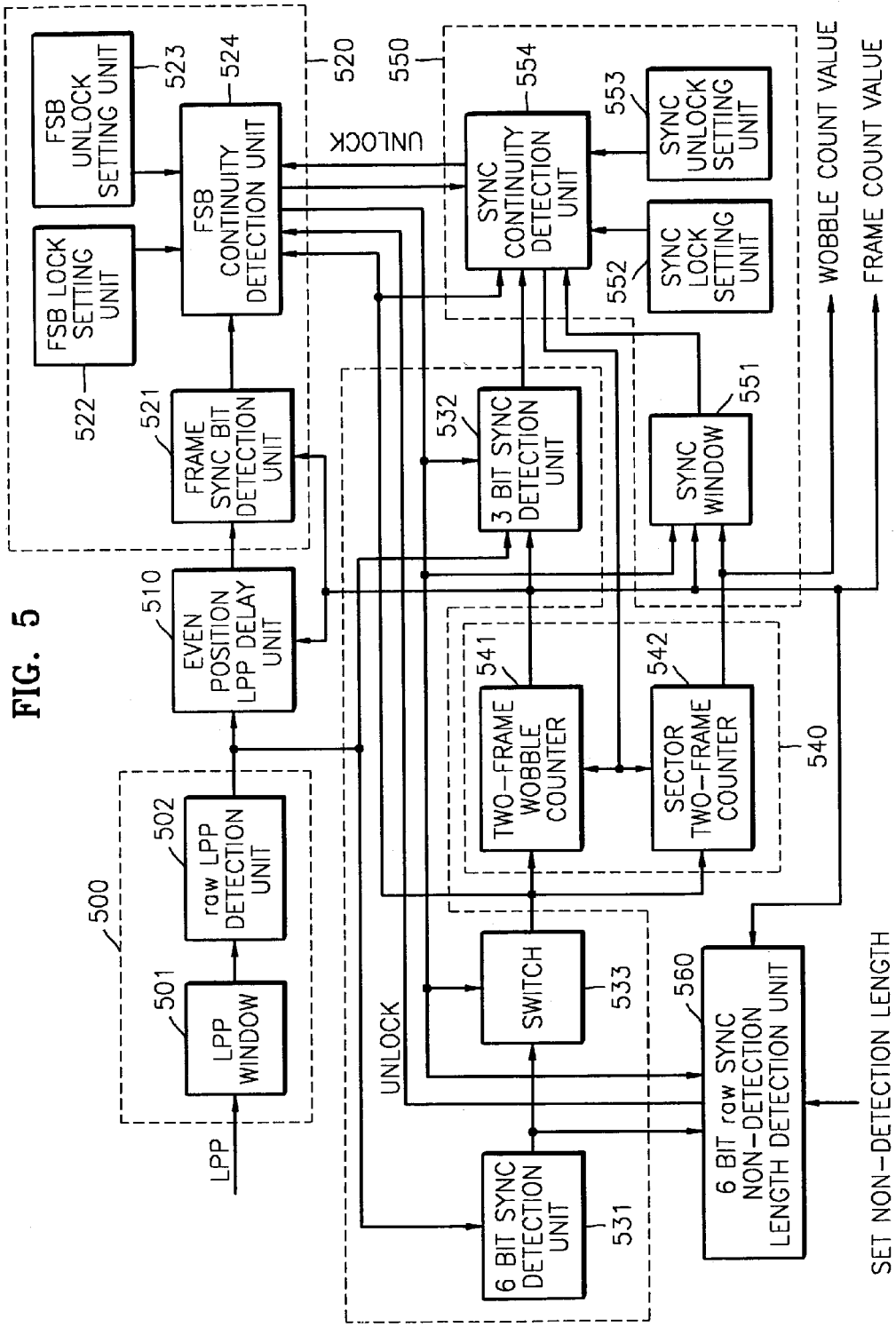
FIG. 5 is a detailed circuit diagram of a sector sync detection unit shown in FIG. 4.

FIG. 5 is a detailed circuit diagram of the sector sync detection unit 430 of FIG. 4. Referring to FIG. 5, the sector sync detection unit 430 includes an LPP detection unit 500, an even position LPP delay unit 510, a frame sync bit consecutive detection unit 520, a sync detection unit 530, a sync detection counter 540, and a sector sync continuity detection unit 550.

The LPP detection unit 500 detects the LPP signal on the optical storage medium using the PLL wobble signal having a phase compensated for by the wobble phase difference compensation unit 420. For the detection of the LPP signal, the LPP detection unit 500 includes an LPP window 501 and a raw LPP detection unit 502. The LPP window 501 generates an LPP window signal used to detect the LPP signal, making the PLL wobble signal having the compensated phase, which has been described above with reference to FIG. 4, a reference signal. For example, the LPP window 501 generates a window having a predetermined width for both sides on the basis of a rising edge of the PLL wobble. By doing so, it is possible to remove the LPP signals generated at abnormal positions. The raw LPP detection unit 502 only detects the LPP signal which can come inside the window generated by the LPP window 501 and extends the detected LPP signal to a certain extent of length in order to detect the LPP signal using the PLL wobble signal having the compensated phase. The LPP signal output from the raw LPP detection unit 502 is a result of performing a logic AND operation on the rising edge of the PLL wobble signal having the compensated phase and the extended LPP signal.

In general, the LPP signal is recorded at an even position of a sector frame. However, a position of the LPP signal may vary between the even position and an odd position for some physical reason. Because it is impossible to predict the position of the location of the LPP signal, it is necessary to perform a logic OR operation on the data which is delayed to be moved to the odd position from the even position and the data originally placed at the odd position. The logic OR operation allows detection of all the LPP signals including the LPP signal having the position changed from the even position to the odd position. The even position LPP delay unit 510 is provided in the sector sync detection unit 430 to detect all the LPP signals having the position changed. Accordingly, it is possible to detect the LPP signals all the time irrespective of the position of the LPP signals.

The frame sync bit consecutive detection unit 520 detects a sync bit from each frame after the sector sync signal is detected and, thus, guarantees reliability of the detection of the sector sync signal. The frame sync bit consecutive detection unit 520 includes a frame sync bit detection unit 521, an frame sync bit lock setting unit 522, a frame sync bit unlock setting unit 523, and a unit 524 for detecting continuity in detection of frame sync bits (referred to as frame sync bit continuity detection unit 524 ). The frame sync bit detection unit 521 detects the frame sync bit, which is an upper bit of the LPP signal including three bits. The frame sync bit is detected using the LPP data delayed by the even position LPP delay unit 510 and a count value indicating the number of wobble periods (wobble count values) in two frames. The fsb is detected in a form of "1xx" when the wobble count value in two frames is at 11, 12, and 13. For example, if the count value is 11 and an LPP pulse is "1", the frame sync bit is detected. The frame sync lock bit setting unit 522 sets a predetermined number so that if the predetermined number of sync bits are consecutively detected from the frames, the detection of the sync bits is determined to be continuous.

The frame sync bit unlock setting unit 523 sets the predetermined number so that if the sync bits are not consecutively detected a predetermined number of times, a discontinuity in the detection of the sync bits is determined. The frame sync bit continuity detection unit 524 compares the number of detected sync bits, which is input from the frame sync bit setting unit 522, with the predetermined number set by the frame sync bit lock setting unit 522 and determines whether or not the frame sync bits have been consecutively detected when the number of detected frame sync bits exceeds the predetermined number set by the frame sync bit lock setting unit 522. If the frame sync bits have been consecutively detected, a currently detected sync is considered reliable. Alternatively, the frame sync bit continuity detection unit 524 compares a number of times of non-detection of frame sync bits with the predetermined number of times of non-detection of the fsb set by the frame sync bit unlock setting unit 523, and determines that there is a discontinuity in the detection of frame sync bits when the frame sync bits have not been detected more than the predetermined number of times set by the fsb unlock setting unit 523. When it is determined that there is discontinuity in the detection of frame sync bits, a currently detected sync is considered unreliable. An output of the frame sync bit continuity detection unit 524 is a measure to determine whether a window for detecting the sector sync signal is a 6-bit long window or a 3-bit long window. In other words, if it is guaranteed that there is continuity in the detection of the frame sync bits, indicative that the position where the sector sync signal is expected to be detected is reliable, the frame sync bit continuity detection unit 524 detects the sector sync signal using the 3-bit long window. On the other hand, if it is not guaranteed that there is continuity in the detection of the frame sync bits indicative that the position where the sector sync signal is expected to be detected is unreliable, the frame sync bit continuity detection unit 524 detects the sector sync signal using a 6-bit long window.

The sync detection unit 530 detects the sector sync signal by selectively using the 6-bit sync detection unit 531 or the 3-bit sync detection unit 532 depending on the output of the frame sync bit continuity detection unit 520. In other words, if the frame sync bits are detected at least a predetermined number of times, the sync detection unit 530 uses the 3-bit sync detection unit 532 which detects the sector sync signal using the 3-bit long window. On the other hand, when the frame sync bits are detected less than the predetermined number of times, the sync detection unit 530 uses the 6-bit sync detection unit 531, which detects the sector sync signal using the 6-bit long window. The sync detection unit 530 may further include a switch 533 to select the 6-bit sync detection unit 531 or the 3-bit sync detection unit 532 depending on the output of the frame sync bit continuity detection unit 520. The detection of the sector sync signal using the 6-bit long window or the 3-bit long window will be described in greater detail later.

The sync detection counter 540 outputs a predetermined count value, and the predetermined count value becomes an output of the sector sync detection unit 430. The sync detection counter 540 includes a two frame wobble counter 541 and a sector two frame counter 542. The two frame wobble counter 541 counts the wobble signal generated over two frames. In the DVD-R/RW, 8 cycles exists of a wobble signal in one frame. Accordingly, the two frame wobble counter 541 can have a value sequentially changing from 0 to 15. The LPP is located in an even frame in most cases except for a special occasion when the LPP is located in an odd frame. If the fsb has not been detected consecutively and, thus, the fsb detection is considered unreliable, the two frame wobble counter 541 is reset to a predetermined value appropriate for detecting a 6-bit sector sync signal. For example, a wobble count value obtained right after the even sector sync signal is detected is reset to be "3", and a wobble count value obtained right after the odd sector sync signal is detected is reset to be "11". Supposing that a three-bit long sync is detected under a circumstance where there is continuity in the detection of frame sync bits, the two frame wobble counter 541 is reset to "2" right after the even sector sync signal is detected and is reset to "10" right after the odd sector sync signal is detected. Thereafter, the two frame wobble counter 541 starts counting. In general, the 3-bit sync detection unit 532 counts faster than the 6-bit detection unit 631 by as much as one wobble count. The sector two frame counter 542 counts every two frames of one sector and outputs a result of the counting. Because there are 26 frames in one sector, the output of the sector two frame counter 542 circularly changes from 0 to 12. A counter value of the sector two frame counter 542 may be appropriately set to a predetermined value when the sector sync signal is detected by the 6-bit sync detection unit 531 under a circumstance where it is not guaranteed that there is a continuity in the detection of the frame sync bits, or when the sector sync signal is detected by the 3-bit sync detection unit 532 under a circumstance where it is not guaranteed that there is a continuity in the detection of the sector sync signals. For example, when the 6-bit even or odd sector sync signal is detected, the sector two frame counter 542 is set to "0" in consideration that the even sync signal or the odd sync signal are included in first two frames and the first two frames are counted as "0" by the sector two frame counter 542. It is possible to decode the LPP data block including a relative address and user data by identifying the sector sync signal using the outputs of the two frame wobble counter 541 and the sector two frame counter 542.

The sector sync continuity detection unit 550 detects a location where the sector sync signal is expected to exist using the count value output from the sync detection counter 540 and determines whether there is a continuity in the detection of the sectors from consecutive frames. For the determination, the sector sync continuity detection unit 550 includes a sync window 551, a sync lock setting unit 552, a sync unlock setting unit 553, and a sync continuity detection unit 554. The sync window 551 figures out the location where the sector sync signal is expected to exist using the count values output from the two frame wobble counter 541 and the sector two frame counter 542 of the sync detection counter 540 and generates a detection window at the expected position of the sector sync signal. The sync lock setting unit 552 provides a reference value used to determine whether or not there is a continuity in the detection of the sector sync signals. The sync unlock setting unit 553 provides a reference value used to determine whether or not there is a discontinuity in the detection of the sector sync signals.

The sync continuity detection unit 554 determines whether or not the sector sync signal is detected at the expected location, i.e., at the place where the detection window generated by the sync window 551 is located, by using the output values of the 3-bit sync detection unit 532 and the sync window 551. If a 3-bit sync is detected at a position where the detection window is placed at least as many times as the reference value set by the sync lock setting unit 532, a sync lock signal is output. If the 3-bit sync signal output from the 2-bit sync detection unit 532 does not exist over the sync window 551, then a count value indicating the number of frame sync bits having been consecutively detected is reset, and the counting process is restarted. Thereafter, if the number of times the 3-bit syncs is consecutively not detected in the sync window 551 is not greater than the reference value set by the sync unlock setting unit 533, a sync unlock signal is generated. The generation of the sync unlock signal indicates that the apparatus is abnormally operating. The sync unlock signal makes the frame sync bit continuity detection unit 520 cancel the continuity in the detection of frame sync bits and return to an early stage of the detection of frame sync bits.

The sector sync detection unit 430 of FIG. 5 further includes a 6-bit sync non-detection length detection unit 560, which cancels abnormal frame sync bit lock. Here, the abnormal frame sync lock occurs when in the position where the LPP is set, the location of 3-bits of the sector sync signal is incorrectly detected due to possible multiple errors. Under a circumstance where the frame sync bits are locked (continuity in the detection of the frame sync bits is guaranteed) and the sector sync is unlocked, the 6-bit sync non-detection length detection unit 560 unlocks the frame sync bits where the 6-bit sync has not been detected and at a three-bit location in an LPP set of the two frame wobble counter 541 for a predetermined period of time, after the 6-bit sync is detected.

Figure 6:
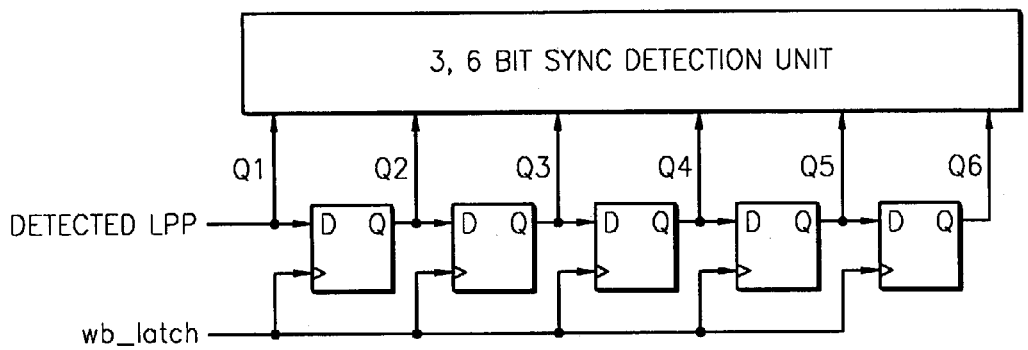
FIG. 6 is a detailed view of the sector sync detection unit shown in FIG. 5.

FIG. 6 is a detailed view of the sync detection unit 530 of FIG. 5. The 3-bit sync detection unit 532 or the 6-bit detection unit 531 latches the input LPP using a PLL wobble signal latched by 3 or 6 latches as the clock signal. Then, outputs of the 3-bit sync detection unit 532 and the 6-bit detection unit 531 are delayed by as long as 3 bits and 6 bits, respectively.

The 6-bit sync detection unit 531 of the sync detection unit 530 will be described in the following paragraphs. The 6-bit syncs detected by the sync detection unit 530 of FIG. 6 have a pattern as follows.

Even sync: x01110, 001111
Odd sync: 001100

According to the above 6-bit sync pattern, it is possible to prevent data '101' from being detected or being mistaken as the sync signal even when a 1-bit error occurs in the data '101', where the data '101' is output in the form of a signal '1101' or '1011'. In addition, it is also possible to prevent data '111' from being mistaken as the sector sync signal even when the data '111' is output in the form of a signal '1111' due to a 1-bit error. If the sector sync signal is detected at a position other than the position where the sector sync signal is expected to exist, it is hard to normally perform LLP decoding, and if possible, it takes a considerable amount of time to achieve the normal LLP decoding. A wrong detection of the sector sync signal may not be able to satisfy a predetermined access time.

The 3-bit syncs detected by the 3-bit sync detection unit 532 have a pattern as follows.

Even sync: 111
Odd sync: 110

According to the above 3-bit sync pattern, if data '111' is detected as a signal '1111' due to the 1-bit error occurring therein, the signal '1111' can be detected as the even sync signal by the 3-bit long window. If data '110' is detected as a signal '1110' or '1101' due to a 1-bit error occurring therein, the signal '1110' or '1101' can be detected as the sector sync signal. However, when data '100' is output in the form of a signal '1100' or '1001' due to a 1-bit signal occurring therein, the signal '1100' or '1001' is prevented from being detected as the sector sync signal.

It takes less time to perform the 3-bit sync detection than the 6-bit sync detection. In addition, it is possible to read an ECC block address using the 3-bit sync detection, and thus, the ability of the optical storage medium drive to record the data on the optical storage medium can be improved. The 3-bit sync is ahead of the 6-bit sync by as much as one wobble count.

Figure 7:
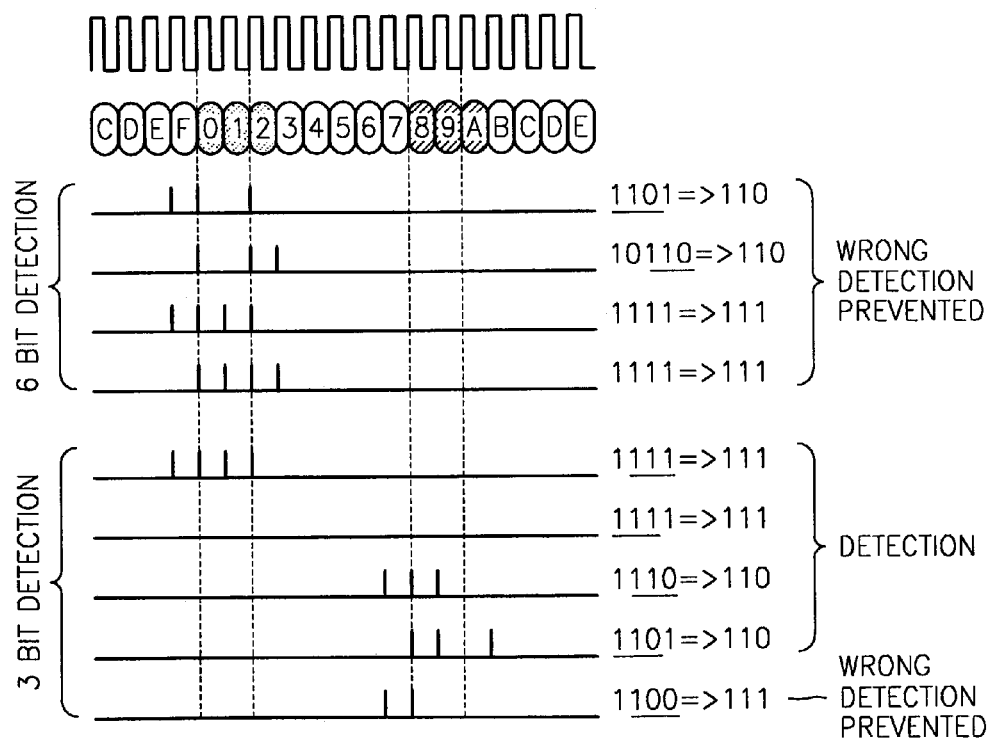
FIG. 7 is a diagram illustrating detection of a 6-bit sync and a 3-bit sync.

FIG. 7 is a diagram illustrating the 6-bit sync detection and the 3-bit sync detection, which have been described above, and FIGS. 8A through 8F is a diagram illustrating an operation of the even position LPP delay unit 510 of FIG. 5. In particular, FIG. 8A shows an example of the LPP signal, FIG. 8B shows the wobble signal, and FIG. 8C shows the count value of wobble signals over two frames. The count value starts from 0 in the even frame, and the count value varies between 0 and 15 (F). FIG. 8 8D shows a result of delaying the LPP data from the even position to the odd position. FIG. 8E shows a result of detecting the frame sync bit every time a frame begins. FIG. 8F shows a result of counting how many times the frame sync bits are consecutively detected. When the frame sync bit is detected for the first time, as shown in FIG. 8E, a count value is reset to "0" and then increases by 1 whenever the frame sync bit is detected. However, if the sync bit is not detected at a place where the sync bit is expected to exist, the count value is reset to "0" again. Here, the expected location of the sync bit is determined based on the count value of the wobble signal over two frames.

FIGS. 9A through 9O are timing diagrams of signals output from each of the blocks shown in FIGS. 4 and 5. In particular, FIG. 9A shows the wobble signal of the optical storage medium, which is input into the wobble PLL unit 400 of FIG. 4. FIG. 9B shows the LPP signal of the optical storage medium. FIG. 9C shows the PLL wobble signal from which the jitter component is removed by the wobble PLL unit 400. FIG. 9D shows the PLL wobble signal having a phase compensated for by as much as the phase difference with the LPP signal. FIG. 9E shows the LPP window signal having a predetermined width expended on the basis of a rising edge of the PLL wobble signal of FIG. 9D placed in the middle. The LPP window signal shown in FIG. 9E is the output of the LPP window 501 shown in FIG. 5.

FIG. 9F shows a signal obtained by holding (or keeping) the result of detecting the LPP signal shown in FIG. 9B using the LPP window shown in FIG. 9E by a predetermined length. FIG. 9G shows the result of latching the compensated PLL wobble signal shown in FIG. 9D by as much as a predetermined phase. FIG. 9H shows the result of holding the wobble-latched signal FIG. 9G according to the result of the LPP detection shown in FIG. 9F for a predetermined period of time between periods of the signal and the next rising edge of the wobble-latched signal of FIG. 9G. The output of the LPP detection unit 502 is the same as the signal shown in FIG. 9G.

FIG. 9F shows an output signal of the 6-bit sync detection unit 531, which is obtained by receiving the sector sync signal having a pattern of 'x01110' from FIG. 9H and then detecting the even sync.

FIG. 9J shows a count value output from the two frame wobble counter 541. Because the even sync is detected as described above with reference to FIG. 9I, a count value of the two frame wobble counter 541 starts to increase from "3", which has been set up as an initial value of the two frame wobble counter 541 in advance. In a case where the even sync bits are consecutively normally detected, the two frame wobble counter 541 circularly counts in the manner of 3, 4, . . . , 15, 0, 1, 2, . . . and restarts counting with a count value of "3" as the initial value when synchronized with the sync detection signal.

FIG. 9K shows a count value output from the sector two frame wobble counter 542. The sector two frame wobble counter 542 counts every two frames of a sector in response to the detected sync signal shown in FIG. 9I. The sector two frame wobble counter 542 resumes counting with a count value of "0" as an initial value, when the even sync is detected in a next sector while the sector two frame wobble counter 542 circularly changes a count value between 0 and 12.

Accordingly, it is possible to identify the moment "3" being output among count values output from the two frame wobble counter 541 shown in FIG. 9J. It is possible to identity the moment "0" being output as the moment the sector sync signal is detected, among count values output from the sector two frame counter 542 shown in FIG. 9K.

As described above, according to the present invention, sync detection from an LPP of an optical storage medium is immune to errors. Accordingly, it is possible to precisely decode information of an LPP set, i.e., a relative address and user data and more precisely follow a position where the relative address and the user data are expected on an optical storage medium when recording data on or reproducing data from the optical storage medium.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus to detect an LPP sync signal on an optical storage medium, comprising:
   a frame sync bit detection unit detecting frame sync bits from the LPP sync signal on the optical storage medium;
   a sync detection unit determining whether continuity exists in the detection of the frame sync bits and selectively detecting a 6-bit sector sync or a 3-bit sector sync using a 6-bit long window or a 3-bit long window, respectively, in response to a result of the determination; and
   a sync detection result output unit outputting a sector sync detection period when continuity exists in the detection of frame sync bits and in the detection of the 3-bit sector sync or the 6-bit sector sync and counting a sync detection signal and a new sync detection period when a sector sync signal is detected by the sync detection unit.

2. The apparatus of claim 1, wherein in a DVD-R or a DVD-RW, the 6-bit sector sync detected at an even position has a pattern of 'x01110' or '001111'.

3. The apparatus of claim 1, wherein in a DVD-R or a DVD-RW, the 6-bit sector sync detected at an odd position has a pattern of '001100'.

4. The apparatus of claim 1, wherein in a DVD-R or a DVD-RW, the 3-bit sector sync detected at an even position has a pattern of '111'.

5. The apparatus of claim 1, where in a DVD-R or a DVD-RW, the 3-bit sector sync detected at an odd position has a pattern of 110'.

6. The apparatus of claim 1, wherein the 3-bit sector syncs are detected only when the frame sync bits are consecutively detected by the frame sync bit detection unit over a predetermined period of time, and the 6-bit sector sync is detected when the frame sync bits are not consecutively detected.

7. The apparatus of claim 1, wherein the frame sync bit detection unit comprises:
   an LPP even position delay unit detecting the LPP sync signal on the optical recording medium, moving data at an even position to an odd position, and detecting the frame sync bits from results of pet-forming a logic OR operation on the data moved to the odd position and the data originally placed at the odd position.

8. The apparatus of claim 1, further comprising:
   a pickup unit reading an electric signal recorded on the optical storage medium;
   a radiofrequency amplifier (RF-AMP) amplifying the electric signal read by the pickup unit and detecting a reproduction signal and a wobble signal from the amplified electric signal;
   a data processor performing sync-detection, insertion, protection, demodulation, and error detection and correction by using the reproduction signal and the wobble signal output from the RF-AMP;
   an adaptive laser power controller receiving a write pulse signal and a write clock signal from the data processor and controlling an amount of laser to record data on the optical storage medium; and
   a host interface unit interfacing with the data processor to record/reproduce the data on/from the optical storage medium.

9. The apparatus of claim 8, further comprising;
   a servo controller receiving a servo-related signal from the data processor and performing servo control operations to control a rotation speed of the optical storage medium; and
   a motor and drive unit rotating the optical storage medium.

10. An apparatus to detect an LPP sync signal on an optical storage medium, comprising:
    a frame sync bit detection unit detecting frame sync bits from the LPP sync signal on the optical storage medium;
    a sync detection unit determining whether continuity exists in the detection of the frame sync bits and detecting a 6-bit sector sync or a 3-bit sector sync using a 6-bit long window or a 3-bit long window, respectively, in response to a result of the determination; and
    a sync detection result output unit outputting a sector sync detection period when continuity exists in the detection of frame sync bits and in the detection of the 3-bit sector sync or the 6-bit sector sync and counting a sync detection signal and a new sync detection period when a sector sync signal is detected by the sync detection unit,
    wherein the sync detection result output unit comprises:
    a two frame wobble counter counting cycles of a wobble signal over two frames; and
    a sector two frame counter counting every two frames of one sector.

11. The apparatus of claim 10, wherein the two frame wobble counter circularly counts from 0 to 15 during a predetermined period of time that the frame sync bits are consecutively detected and starts counting with a predetermined count value as an initial value when the sector sync signal is detected by the sync detection unit when the frame sync bits are not consecutively detected.

12. The apparatus of claim 11, wherein a count value of the two frame wobble counter is set to "3" when a 6-bit even sync is detected and the frame sync bits are not consecutively detected.

13. The apparatus of claim 11, wherein a count value of the two frame wobble counter is set to "11" when a 6-bit odd sync is detected and the frame sync bits are not consecutively detected.

14. The apparatus of claim 11, wherein a count value of the two frame wobble counter is set to "2" when a 3-bit even sync is detected and the frame sync bits are not consecutively detected.

15. The apparatus of claim 11, wherein a count value of the two frame wobble counter is set to "10" when a 3-bit odd sync is detected and the frame sync bits are not consecutively detected.

16. The apparatus of claim 7, wherein the sector two frame counter circularly counts from 0 to 12 during a predetermined period of time that the frame sync bits as well as the 3-bit sector sync or the 6-bit sector sync is consecutively detected, and starts counting with a predetermined count value as an initial value when the frame sync bits or the sector sync signal is not consecutively detected.

17. The apparatus of claim 16, wherein a count value of the sector two frame counter is reset to "0" when an even sync or an odd sync is detected and the frame sync bits or the sector sync signal is not consecutively detected.

18. The apparatus of claim 10, further comprising:
   a sync continuity detection unit determining whether continuity exists in the detection of the 3-bit sector sync or the 6-bit sector sync, generating a sync detection window at a sync generation count location based on outputs of the two frame wobble counter and the sector two frame counter, and determining that continuity exists in the detection of the 3-bit sector sync or the 6-bit sector sync when the 3-bit sector sync is detected in the corresponding window.

19. A method of detecting an LPP signal on an optical storage medium, comprising:
   detecting frame sync bits from the LPP signal on the optical storage medium;
   determining whether continuity exists in the detection of the frame sync bits;
   detecting a 3-bit sector sync using a 3-bit long window when continuity exists in the detection of the frame sync bits;
   detecting a 6-bit sector sync using a 6-bit long window when continuity does not exist in the detection of the frame sync bits;
   detecting whether continuity exists in the detecting of the 3-bit sector sync or the 6-bit sector sync;
   outputting a sync detection period when continuity exists in the detection of the frame sync bits and in the detection of the 3-bit sector sync or the 6-bit sector sync; and
   outputting a predetermined sync detection count value when a sector sync signal is detected when there is no continuity in the detection of the frame sync bits and in the detection of the 3-bit sector sync or the 6-bit sector sync.

20. The method of claim 19, wherein in a DVD-R or a DVD-RW, the 6-bit sector sync detected at an even position has a pattern of 'x01110' or '001111'.

21. The method of claim 19, wherein in a DVD-R or a DVD-RW, the 6-bit sector sync detected at an odd position has a pattern of '001100'.

22. The method of claim 19, wherein in a DVD-R or a DVD-RW, the 3-bit sector sync detected at an even position has a pattern of '111'.

23. The method of claim 19, where in a DVD-R or a DVD-RW, the 3-bit sector sync detected at an odd position has a pattern of 110'.

24. The method of claim 19, wherein when outputting a result of the detection of the 3-bit sector sync or the 6-bit sector sync, a count value indicating a number of cycles of a wobble signal in two frames and a count value indicating a number pairs of frames existing in one sector are output.

25. The method of claim 24, wherein the count value obtained by counting cycles of the wobble signal in two frames circularly changes between 0 and 15 when the frame sync bits are consecutively detected and counting starts with a predetermined count value as an initial value when the sector sync is detected and the frame sync bits are not consecutively detected.

26. The method of claim 25, wherein the count value obtained by counting cycles of the wobble signal in two frames is set to "3" when a 6-bit even sync is detected and the frame sync bits are not consecutively detected.

27. The method of claim 25, wherein the count value obtained by counting cycles of the wobble signal in two frames is set to "11" when a 6-bit odd sync is detected and the frame sync bits are not consecutively detected.

28. The method of claim 25, wherein the value obtained by counting cycles of the wobble signal in two frames is set to "2" when a 3-bit even sync is detected and the frame sync bits are not consecutively detected.

29. The method of claim 25, wherein the count value obtained by counting cycles of the wobble signal in two frames is set to "10" when a 3-bit odd sync is detected and the frame sync bits are not consecutively detected.

30. The method of claim 19, wherein detecting the frame sync bits is performed after the LPP signal is detected on the optical recording medium, data at an even position is moved to an odd position, and frame sync bits are detected from results of performing a logic OR operation on the data moved to the odd position and the data originally placed at the odd position and delaying the result of the logic OR operation.

31. The method of claim 24, wherein the count value indicating the number of pairs of frames existing in one sector circularly changes between 0 and 12 during the frame sync bits and the 3-bit sector sync or the 6-bit sector sync is consecutively detected, and counting starts with a predetermined count value as an initial value when the frame sync bits, the 3-bit sector sync-or the 6-bit sync bit are not consecutively detected.

32. The method of claim 31, wherein the count value indicating how many pairs of frames exist in one sector is reset to "0" when an even sync or an odd sync is detected when the frame sync bits or the sync bits are not consecutively detected.

33. The method of claim 24, further comprising:
   determining whether continuity exists in the detection of the sector sync signals,
   wherein in determining whether continuity exists in the detection of the sector sync signals, a sync detection window is generated at a sync generation count position, and continuity is determined in the detection of the sector syncs when the 3-bit sector sync is detected in a corresponding window.

34. An LPP signal detection circuit to detect an LPP sync signal on an optical storage medium, comprising:
   a wobble PLL unit outputting a wobble clock signal from a phase locked loop in response to an input wobble signal and a PLL wobble signal synchronized with the wobble clock signal;
   a wobble phase difference detection unit detecting a phase difference between a predetermined phase reference signal and the PLL wobble signal output from the wobble PLL unit;

a wobble phase difference compensation unit compensating a phase of the PLL wobble signal by the phase difference detected by the wobble phase difference detection unit;

a sector sync detection unit detecting sector sync signals from the LPP sync signal using the PLL wobble signal having the compensated phase, wherein the sector sync signals are selectively detected using a 6-bit detection window or a 3-bit detection window depending on whether a sync bit recorded in each frame making a sector is consecutively detected and is reflected;

a LPP data conversion unit receiving a count value indicating the detection of the sector sync signals from the sector sync detection unit and converting three-bit long LPP signals into data values of "1" or "0" and an LPP decoding unit arranging the data values received from the LPP data conversion unit and performing an error correction code ECC correction on the data.

35. The apparatus of claim 34, when frame sync bits are consecutively detected a predetermined number of times and the sector sync signals are consecutively detected, the sector sync detection unit circularly outputs a wobble count value obtained during a 2-frame-length and every 2-frame-count value to indicate when to detect the sector sync signal at a certain count value.

36. The apparatus of claim 35, wherein the sector sync detection unit comprises:

an LPP detection unit detecting the LPP signal on the optical storage medium using the PLL wobble signal, an even position LPP delay unit detecting the LPP signal having a position changed, a frame sync bit consecutive detection unit detecting the sync bit from each frame after the sector sync signal is detected, a sync detection unit determining whether continuity exists in the detection of the frame sync bits and detecting a 6-bit sector sync or a 3-bit sector sync using the 6-bit long window or the 3-bit long window, respectively, in response to a result of the determination, and a sync detection result output unit outputting a sector sync detection period when continuity exists in the detection of the frame sync bits and in the detection of the 3-bit sector sync or the 6-bit sector sync and counting a sync detection signal and a new sync detection period when a sector sync signal is detected by the sync detection unit.

37. The apparatus of claim 36, wherein the sync detection result output unit comprises:

a two frame wobble counter counting cycles of a wobble signal over two frames, and a sector two frame counter counting every two frames of one sector.

38. The apparatus of claim 37, further comprising:

a sync continuity detection unit determining whether continuity exists in the detection of the 3-bit sector sync or the 6-bit sector sync, generating a sync detection window at a sync generation count location based on outputs of the two frame wobble counter and the sector two frame counter, and determining that continuity exists in the detection of the 3-bit sector sync or the 6-bit sector sync when the 3-bit sector sync is detected in the corresponding window.

39. The apparatus of claim 34, wherein when frame sync bits and the sector sync signals are not consecutively detected, the sector sync detection unit forcibly outputs a certain count value right after the sector sync signal is detected.

* * * * *

UNITED STATES PATENT AND TRADEMARK OFFICE
CERTIFICATE OF CORRECTION

PATENT NO. : 7,245,573 B2 Page 1 of 1
APPLICATION NO. : 10/414159
DATED : July 17, 2007
INVENTOR(S) : Woo-sik Eom It is certified that error appears in the above-identified patent and that said Letters Patent is hereby corrected as shown below:

Column 14, Line 2, change "pet-forming" to --performing--.

Column 14, Line 23, change "comprising;" to --comprising:--.

Column 16, Line 41, after "sector sync-or" insert --,--.

Column 17, Line 15, after ""0"" insert --,--.

Signed and Sealed this

Twentieth Day of November, 2007

JON W. DUDAS
*Director of the United States Patent and Trademark Office*